No. 694,153. Patented Feb. 25, 1902.
J. P. HOLLAND.
MEANS FOR AUTOMATICALLY BALLASTING SUBMARINE BOATS.
(Application filed July 27, 1901.)
(No Model.)
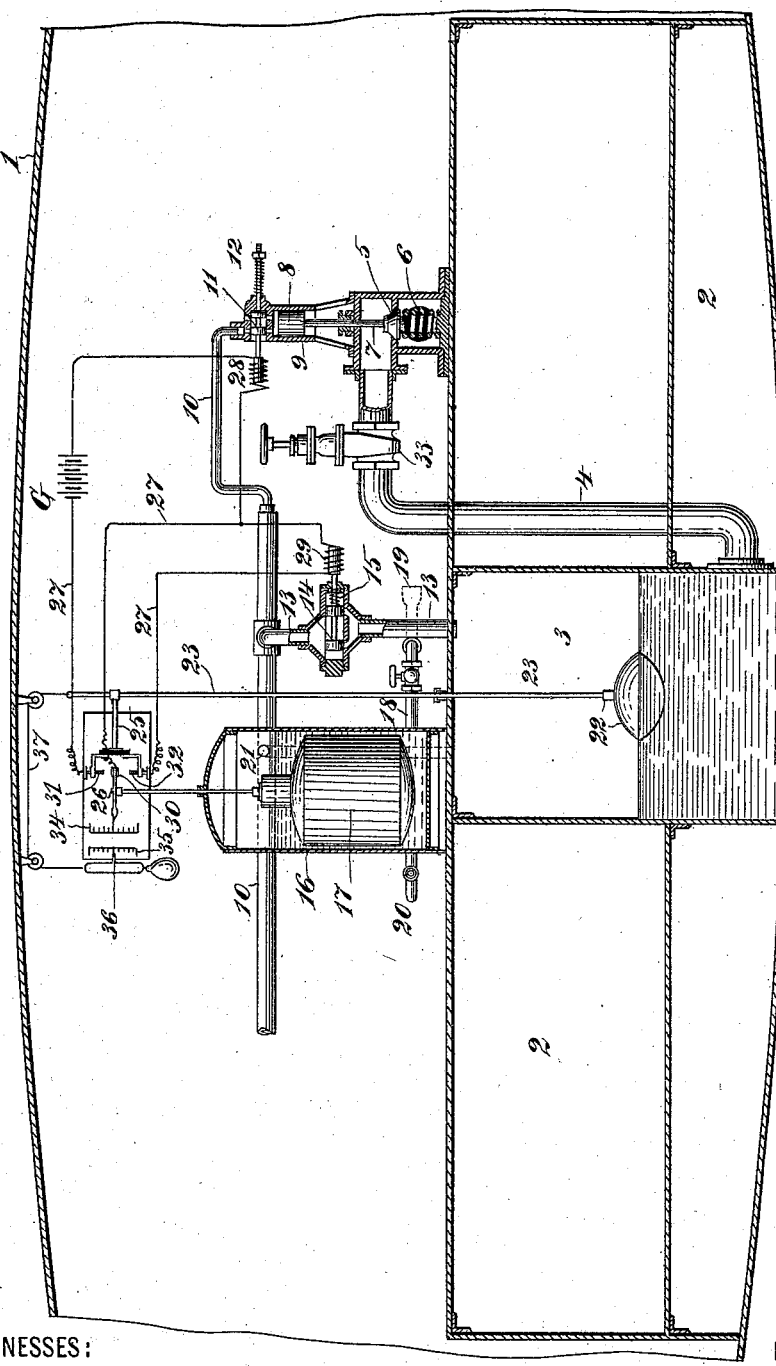
WITNESSES:
INVENTOR
John P. Holland
BY
Henry Cornwell
ATTORNEY

United States Patent Office.

JOHN P. HOLLAND, OF NEWARK, NEW JERSEY.

MEANS FOR AUTOMATICALLY BALLASTING SUBMARINE BOATS.

SPECIFICATION forming part of Letters Patent No. 694,153, dated February 25, 1902.

Application filed July 27, 1901. Serial No. 69,887. (No model.)

*To all whom it may concern:*

Be it known that I, JOHN P. HOLLAND, a citizen of the United States, and a resident of Newark, in the county of Essex and State of New Jersey, have invented certain Improvements in Means for Automatically Ballasting Submarine Boats, of which the following is a specification.

This invention relates to means for automatically regulating the water ballast of a submarine boat to adapt the latter for either fresh or salt water operations.

A submarine boat or vessel intended for operation with equal facility in fresh or salt water or in an uncertain mixture of both, such as is ordinarily found in estuaries and harbors on the sea-coast, is provided with ballast-tanks, some or all of which are filled with water ballast to put the boat in proper condition for diving, and the boat is also provided with a special ballast-tank, which is designed to contain a quantity of water, which must be regulated so as to adapt the boat to the degree of salinity of the water in which it is to operate in order that it may dive with facility. This requirement is due, of course, to the difference in specific gravity of salt and fresh water and to the fact that this difference varies with the degree of salinity. The rapidity with which the boat may be put in diving condition will be greatly facilitated by effecting this regulation of the total weight of the boat automatically, the total weight being increased correspondingly with the increased specific gravity of the water in which it may be necessary to operate in moving from fresh water into saline water and reduced correspondingly when moving from salt water into fresh water.

The object of the present invention is to provide means for thus automatically varying the total weight of the vessel in accordance with the specific gravity of the water of flotation.

The accompanying drawing illustrates an embodiment of the invention.

The figure is a longitudinal vertical section of the middle portion of the boat.

Before proceeding to describe the specific construction of the automatic device it may be well to explain that it comprises as its instrumentalities a hydrometer of considerable displacement contained in a case into which the water in which the boat floats may be made to enter, when the boat moves ahead, through a pipe with its inlet turned forward. Another pipe passes outboard from the predetermined water-level in the casing. Both of these pipes have controlling-cocks in order that the water in the casing may be retained or be changed at will. The water-ballast tank, which is designed to contain the water, which is equal to the difference of the boat's displacement in fresh and salt water, is provided with a float and is connected with the water of flotation by a pipe controlled by a Kingston valve, which opens outwardly and is held up to its seat by a spring. A piston in a cylinder is connected with the said valve, and a pipe from a source of compressed air leads to said cylinder, while another similar air-pipe leads to the upper part of the water-ballast tank. In these air-pipes are controlling-valves adapted to be opened by electrical means. When the hydrometer rises by reason of the increased salinity of the water of flotation, a circuit is closed, which acts to admit compressed air above the piston, and the Kingston valve is opened. Water flows into the ballast-tank and eventually lifts the float therein. When the float is lifted, it breaks the circuit controlling the air-valve at the cylinder and allows said valve to close. The spring of the Kingston valve then closes it and cuts off the further influx of water. Should the boat move from salt into fresh water, the hydrometer will descend and in doing so close another circuit controlling the air-valve, which admits compressed air into the tank. The air admitted will blow out the surplus water from the tank by the Kingston valve until the float in the tank descends and breaks the circuit, when the air-valve will close automatically.

Let 1 represent the body of the boat or vessel, 2 the main water-ballast tanks therein, and 3 the tank to contain water for varying the total weight of the boat. The tank 3 is connected with the water of flotation by a pipe 4, which is controlled by a valve 5, which will be by preference of kind known as a "Kingston" valve. This valve opens outwardly and is closed by a spring 6, and its stem 7 is connected to a piston 8 in a cylinder 9, to which some aeriform fluid, as compressed air, may be admitted through a pipe 10 for depressing the piston and opening the valve 5 to admit water to the tank 3. The flow of air to the cylinder 9 is controlled by a balanced valve 11, which is held closed by a spring 12. A branch air-pipe 13 connects with the top of the tank 3, and the flow of air through the pipe is controlled by a balanced valve 14, similar to the valve 11 and closed normally by a spring 15.

A casing 16 contains a hydrometer 17. The casing is designed to contain water of the same specific gravity as that in which the boat is operating, and in this water the hydrometer floats. The water is supplied to the casing by means of a supply-pipe 18, which projects out through the side of the boat and is directed forward, as indicated in dotted lines at 19. The proper circulation of the water through the casing 16 is maintained through the medium of a pipe 20, situated at the opposite side to the pipe 18 and extends out through the side of the boat. When the water has flowed through the casing for a time, the latter will become charged with the water in which the boat is operating at the time of charging. To maintain an exact uniform water-level in the casing, the latter is provided with an overflow-outlet 21, from which a suitable pipe leads the small amount of surplus water to the bilge of the boat.

In the tank 3 is a float 22, the stem 23 of which extends upward through the top of the tank and is provided with an arm 25. The stem of the hydrometer 17 also extends upward parallel with the stem 23 and carries a cross-arm 26.

The electrical devices will now be described, premising that there is nothing especially new in them, and the present invention is not limited to them. In the drawing these devices are indicated diagrammatically.

G is a generator of any kind, and 27 are the conductors of two circuits, one including the coil of a solenoid 28 and the other including the coil of a solenoid 29. The circuits have a common terminal 30, carried by the arm 26 of the hydrometer, the other terminals 31 and 32 being carried by the slide-arm 25 of the float. As represented, the respective stems of the air-valves 11 and 14 carry the cores of the solenoids 28 and 29.

As the parts are represented in the drawing the boat is in water of mean specific gravity and the hydrometer stands so that the common terminal 30, carried by its stem, occupies a position half-way between the terminals 31 and 32. The boat under these conditions, we will suppose, moves into salt water of maximum specific gravity and the cocks in the pipes connected with the hydrometer-casing are opened, so as to change the water therein. After the water is changed these cocks are again closed. The hydrometer now rises under the influence of the increased specific gravity of its water of flotation, and this serves to put the common terminal 30 into contact with the terminal 31, thus closing the circuit through the coil of the solenoid 28. This has the effect to open the air-valve 11 and admit the fluid under tension above the piston in the cylinder, thereby driving the piston down and opening the valve 5. Water now flows through the pipe 4 to the tank 3 and raises the float 22 therein. This rise of the float acts through the stem 23 to move upward the arm 25 and break the circuit through the solenoid 28, permitting the spring of the valve 11 to close it, and at the same time allow the air to escape from the cylinder. The spring of the valve 5 now closes it and cuts off the inflow of water. Starting from the same point as before, if the boat moves into fresh water and the water in the casing 16 is changed the hydrometer will descend and cause the terminal 30 to close a circuit through the coil of the solenoid 29. This has the effect to open the air-valve 14 and admit the fluid under tension to the tank 3, whereby water is forced therefrom, the valve 5 opening to permit it to flow out. The float 22 now descends and breaks the circuit by moving down the terminal 32.

In the pipe 4 is a gate-valve 33, which may be closed to cut off the entire apparatus, and at 34 is a scale designed to form a visual indicator of the density of the water in the casing 16.

To denote the volume of water in the tank 3, there is a scale 35 adjacent to the scale 34. A pointer 36 traverses the scale 35, being operated by the stem of the float through a cord or wire 37, which passes over suitable guide-sheaves.

It will be obvious that the cock or valve controlling the admission of compressed air to the tank 3 for blowing out the water and the cock or valve for admitting water to said tank may be operated by hand, if desired or necessary, and this hand operation may be provided for even where automatic controlling devices are employed.

Having thus described my invention, I claim—

1. A submarine boat having a tank to contain water ballast, said tank having valve-controlled communication with the water of flotation, means for opening said valve to admit water to the tank, means for admitting an aeriform fluid to said tank for blowing out water therefrom, a hydrometer, electrical means controlled by the rise and fall of said hydrometer for actuating the means for admitting water to and discharging it from said tank, and a float in said tank which breaks the electric circuits established by the hydrometer.

2. A submarine boat having a tank to contain water ballast, said tank having valve-controlled communication with the water of flotation, means for admitting water to and discharging it from said tank, a hydrometer, means for changing the water in which the hydrometer floats, electrical means, controlled by the rise and fall of the hydrometer, for actuating the means for admitting water to and discharging it from the tank, and a float in the tank which breaks the electric circuits established by the hydrometer.

3. A submarine boat having a tank to contain water ballast, mechanism for admitting water to and discharging it from said tank, a hydrometer, and electrical means, controlled by the rise and fall of said hydrometer, for setting in operation the means for admitting water to and discharging it from said ballast-tank.

4. A submarine boat having a water-ballast tank in communication with the water of flotation, and having a valve 5 controlling said communication, in combination with a cylinder, a piston therein, a valve for admitting a compressed aeriform fluid to said piston for opening the valve 5, a valve for admitting compressed aeriform fluid to the ballast-tank for blowing out water therefrom, a hydrometer-casing, means for changing the water of flotation therein, a hydrometer in said casing and provided with a stem carrying the common terminal 30, of two electric circuits, a float in the ballast-tank, provided with a stem, an arm 25 carrying the two terminals 31 and 32 of the said circuits and electrical means including a generator and the said terminals, for operating the valves which control the aeriform fluid.

5. A submarine boat having a tank to contain water ballast, said tank having communication with the water of flotation, a cock or valve controlling said communication, means for admitting an aeriform fluid to said tank for blowing out the water, means for visually indicating the quantity of water in said tank at all times, a hydrometer communicating with the water of flotation and having a visual indicator for indicating the specific weight of the water, substantially as set forth.

6. A submarine boat having a hydrometer in communication with the water of flotation for determining the specific weight of the latter, a tank to contain water ballast, said tank having communication with the water of flotation for filling and emptying, a cock or valve controlling said communication, means for admitting a compressed aeriform fluid to the tank for blowing the water therefrom, and automatic means for varying the amount of water in said tank proportionately to the specific weight of the water of flotation, substantially as set forth.

7. A submarine boat having a tank to contain water ballast, said tank having communication with the water of flotation, a cock or valve controlling said communication, means for admitting an aeriform fluid to said tank for blowing out the water, means for visually indicating at all times the quantity of water in the tank, a hydrometer communicating with the water of flotation and provided with a visual indicator for indicating the specific weight of the water of flotation, and means for regulating the amount of water in said tank proportionately to the specific weight of the water of flotation, substantially as set forth.

In witness whereof I have hereunto signed my name, this 24th day of July, 1901, in the presence of two subscribing witnesses.

JOHN P. HOLLAND.

Witnesses:
PETER A. ROSS,
K. M. CAPLINGER.